United States Patent
Gao et al.

(10) Patent No.: US 8,570,089 B2
(45) Date of Patent: Oct. 29, 2013

(54) IMPROVING THE RESPONSE OF AN UNDER-DAMPED SYSTEM

(75) Inventors: Sarah Gao, Shanghai (CN); Jianhua Zhao, Shanghai (CN); Wadeo Ou, Shanghai (CN)

(73) Assignee: STMicroelectronics R&D Co. Ltd. (Shanghai), Shanghai (CN)

( * ) Notice: Subject to any disclaimer, the term of this patent is extended or adjusted under 35 U.S.C. 154(b) by 378 days.

(21) Appl. No.: 12/968,633

(22) Filed: Dec. 15, 2010

(65) Prior Publication Data

US 2011/0156763 A1    Jun. 30, 2011

(30) Foreign Application Priority Data

Dec. 31, 2009    (CN) .......................... 2009 1 1000096

(51) Int. Cl.
  *H03L 5/00* (2006.01)
(52) U.S. Cl.
  USPC ........................................... 327/306; 331/37
(58) Field of Classification Search
  None
  See application file for complete search history.

(56) References Cited

U.S. PATENT DOCUMENTS

| 6,950,321 | B2* | 9/2005 | Stancu et al. .................. 363/40 |
| 7,180,337 | B2* | 2/2007 | Feldtkeller .................... 327/108 |
| 7,612,957 | B1  | 11/2009 | Wu et al. |
| 7,856,964 | B2* | 12/2010 | Sykes et al. .................. 123/490 |
| 2008/0297225 | A1* | 12/2008 | Olson ........................... 327/351 |

OTHER PUBLICATIONS

Mark Murphy, Mel Conway, Gary Casey, "Lens Drivers Focus on Performance in High-Resolution Camera Modules", Analog Dialogue 40-11, Nov. 2006, http://www.analog.com/analogdialogue, pp. 3.

Damping, From Wikipedia, the free encyclopedia, http://en.wikipedia.org/wiki/Damping, pp. 7, Dec. 14, 2010.

* cited by examiner

*Primary Examiner* — Cassandra Cox
(74) *Attorney, Agent, or Firm* — Graybeal Jackson LLP

(57) ABSTRACT

An embodiment of a circuit for driving an under-damped system comprises first and second signal generators. The first generator is operable to generate a first drive signal. And the second generator is operable to receive the first drive signal and a second drive signal, and to generate from the first and second drive signals a system drive signal having a first amplitude for a first duration and having a second amplitude after the first duration, the system drive signal operable to cause the under-damped system to operate in a substantially damped manner. Either or both of the first and second generators may be programmable such that one may adjust the response of any under-damped system by generating an appropriate drive signal instead of by physically modifying the system itself. In another embodiment, an under-damped system is caused to oscillate at a damped frequency having a first phase, and is also caused to oscillate at substantially the damped frequency having a second phase such that the oscillation at the first phase substantially cancels the oscillation at the second phase. Such embodiments may allow one to realize a faster settling time without slowing down the response time of an under-damped system.

34 Claims, 8 Drawing Sheets

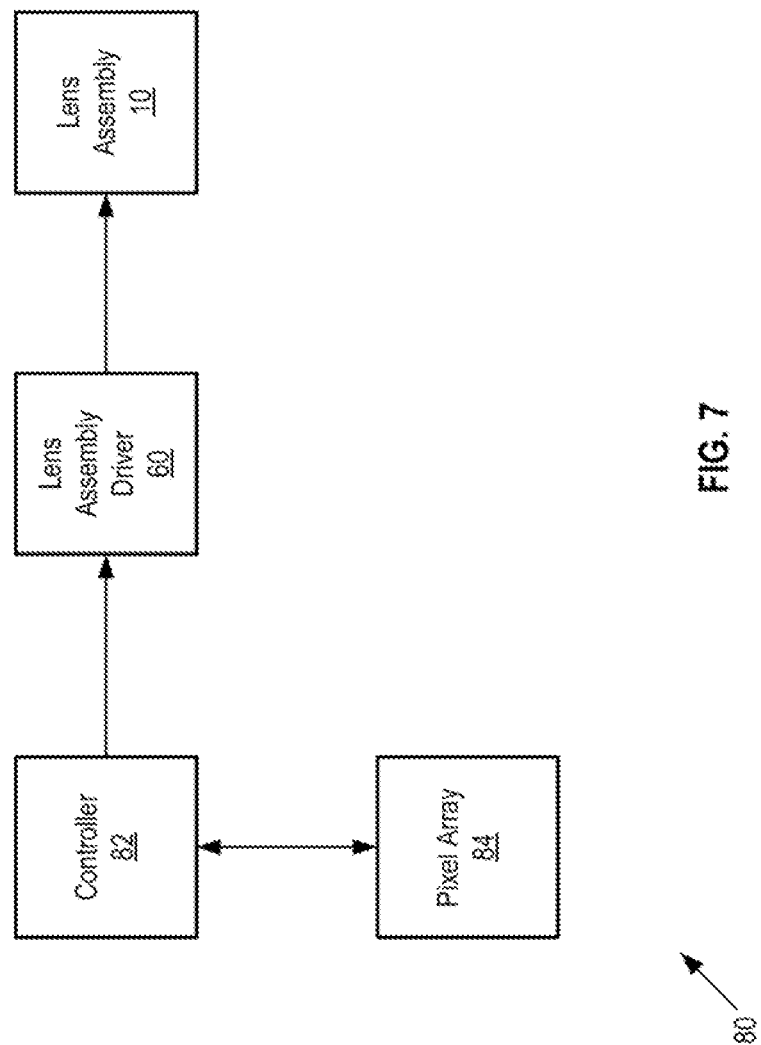

US 8,570,089 B2

IMPROVING THE RESPONSE OF AN UNDER-DAMPED SYSTEM

PRIORITY CLAIM

The instant application claims priority to Chinese Patent Application No. 200911000096.7, filed Dec. 31, 2009, which application is incorporated herein by reference in its entirety.

SUMMARY

An embodiment of a circuit for driving an under-damped system includes first and second signal generators. The first generator is operable to generate a first drive signal. And the second generator is operable to receive the first drive signal and a second drive signal, and to generate from the first and second drive signals a system drive signal having a first amplitude for a first duration and having a second amplitude after the first duration, the system drive signal operable to cause the under-damped system to operate in a substantially damped manner. Either or both of the first and second generators may be programmable such that one may adjust the response of any under-damped system by generating an appropriate drive signal instead of by physically modifying the system itself.

In another embodiment, an under-damped system is caused to oscillate at a damped frequency having a first phase, and is also caused to oscillate at substantially the same damped frequency having a second phase, such that the oscillation at the first phase substantially cancels the oscillation at the second phase.

Such embodiments may allow one to realize a faster settling time without slowing down the response time of an under-damped system.

BRIEF DESCRIPTION OF THE DRAWINGS

FIG. 7 is a diagram of a system that may incorporate an embodiment of the lens assembly of FIG. 1 and an embodiment of a drive circuit of FIGS. 5 and 6.

DETAILED DESCRIPTION

Figure 1:
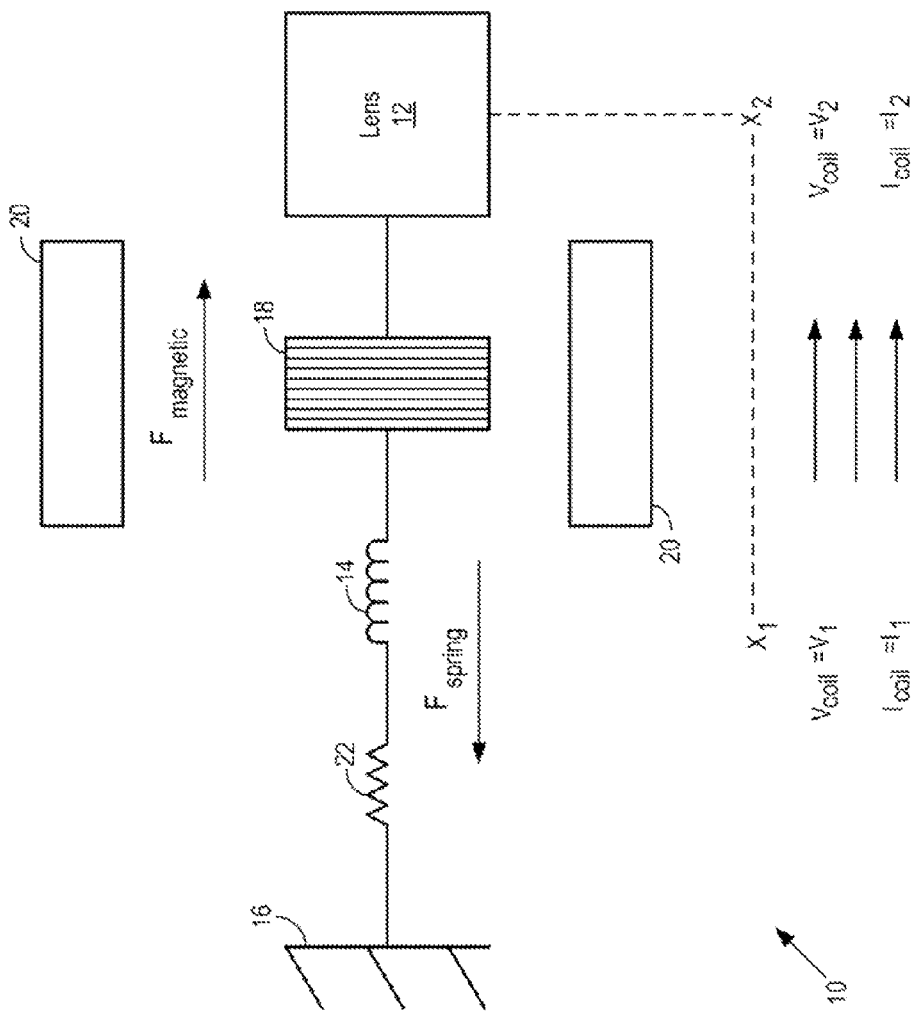
FIG. 1 is a diagram of an embodiment of a spring-loaded electromagnetic lens assembly.

FIG. 1 is a diagram of an embodiment of a spring-loaded electromagnetic lens assembly 10, which includes a focusable lens 12. The lens assembly 10 may be part of a system such as a camera or video recorder (not shown in FIG. 1). An example of such a lens assembly is shown in U.S. Pat. No. 7,612,957, which is incorporated by reference.

In addition to the lens 12, the lens assembly 10 includes a spring 14 for forcing the lens toward a reference location 16, and includes a coil 18 and at least one permanent magnet 20 (two magnets shown in FIG. 1), which cooperate to force the lens away from the reference location. Because one may model the lens assembly 10 as a second-order spring-mass system, a damper 22 is included in FIG. 1 to represent a level of damping inherent in the lens assembly—the damper is not an actual component of the lens assembly, but represents the combination of all of the sources of damping, such as the stiffness of the spring 14 and any friction that the lens 12 may encounter as it moves. The coil 18 may include an electrical resistance, an indication of which is omitted from FIG. 1. Furthermore, the combination of the spring 14, coil 18, and at least one magnet 20 is sometimes referred to as a spring-loaded voice-coil motor (vcm).

In operation, the system (e.g., a camera) in which the lens assembly 10 is installed determines (e.g., with an auto-focus circuit not shown in FIG. 1) a position of the lens 12 for proper focusing, and generates and sends a corresponding drive voltage $V_{coil}$ to the coil 18. Because the lens 12 is to "step" from its current position to a focus position, the system "steps" the drive voltage $V_{coil}$ such that when $V_{coil}$ is applied across the coil 18, the resulting current $I_{coil}$ through the coil is sufficient to move the lens to, and thereafter maintain the lens at, the focus position.

For example, assume that the lens 12 is currently in a position $x_1$ relative to the reference location 16, and that the focus position $x_2$ (the position of the lens 12 shown in FIG. 1) is farther away from the reference location 16 than is $x_1$.

Therefore, to move the lens 12 from $x_1$ to $x_2$, the system substantially steps the voltage $V_{coil}$ across the coil 18 from a starting coil voltage $V_{coil}=V_1$ to an ending coil voltage $V_{coil}=V_2$ that is higher than $V_1$.

Because the coil 18 acts as an inductor, although the current $I_{coil}$ through the coil increases, it does not step from one value to another, at least not as quickly as the voltage $V_{coil}$ from $V_1$ to $V_2$. But over a period of time that depends, e.g., on the inductance of the coil 18, the drive voltage $V_2$ does cause the coil current $I_{coil}$ to increase from a starting current $I_{coil}=I_1$ to an ending current $I_{coil}=V_2/R_{coil}=I_2$ that is greater than $I_1$, where $R_{coil}$ is the resistance of the coil 18 ($R_{coil}$ is omitted from FIG. 1).

As the coil current $I_{coil}$ increases, the magnitude of the magnetic field generated by the coil 18 increases, and this increasing coil magnetic field interacts with the magnetic field generated by the magnets 20 so as to increase the net magnetic force $F_{magnetic}$ in a direction away from the reference location 16.

As $F_{magnetic}$ increases and becomes larger than the spring force $F_{spring}$, it causes the lens 12 to move away from the reference location 16.

Therefore, $F_{magnetic}$ continues to increase, and the lens 12 continues to move, until $I_{coil}$ reaches $I_2$, at which time $F_{magnetic}$ reaches its steady-state value and the lens 12 approximately attains the position $x_2$, which is the position of the lens 12 shown in FIG. 1.

The lens 12 remains approximately in the position $x_2$ as long as $V_{coil}$ and $I_{coil}$ remain at $V_2$ and $I_2$ respectively.

Still referring to FIG. 1, alternate embodiments of the lens assembly 10 are contemplated. For example instead of pulling the lens 12 toward the reference location 16, the spring 14 may push the lens away from the reference location; and instead of forcing the lens away from the reference location, the combination of the coil 18 and magnets 20 may force the lens toward the reference location Referring to FIG. 2, a potential problem with the lens assembly 10 is described.

Figure 2:
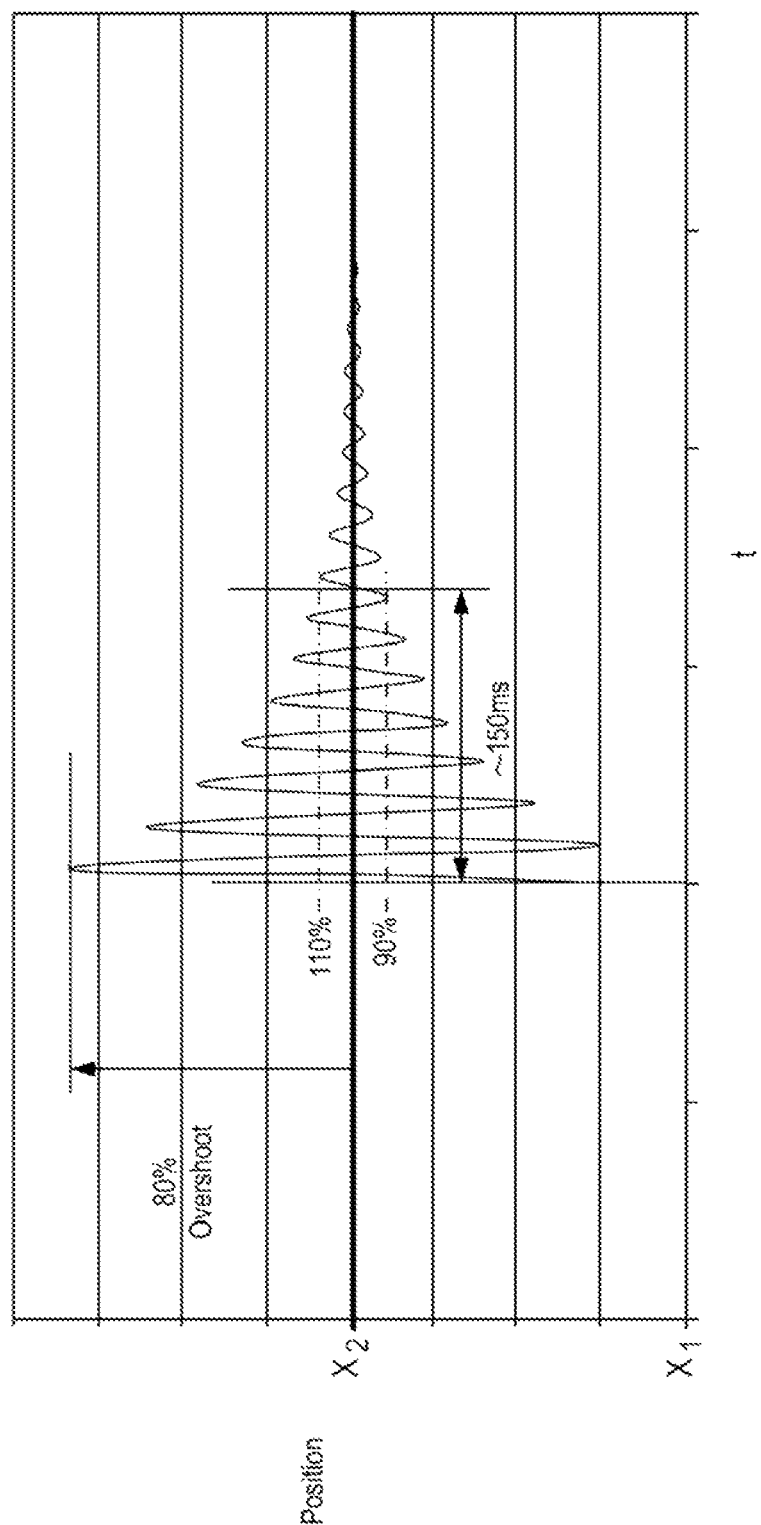
FIG. 2 is a plot of the step response of an embodiment of the assembly of FIG. 1.

FIG. 2 is a plot of the position of the lens 12 versus time for an under-damped embodiment of the lens assembly 10 of FIG. 1, where the voltage $V_{coil}$ across the coil 18 is theoretically stepped instantaneously from $V_{coil}=V_1$ to $V_{coil}=V_2$. Although an actual instantaneous stepping of $V_{coil}$ from $V_1$ to $V_2$ may be impractical or impossible, a theoretical stepping of $V_{coil}$ from $V_1$ to $V_2$ allows one to examine the step response of the lens assembly 10, and to thus gain an insight into the operation of the lens assembly when $V_{coil}$ is increased from $V_1$ to $V_2$ in a relatively short time.

Referring to FIGS. 1 and 2, if the lens assembly 10 is under-damped (i.e., the damping level is relatively low) and the coil voltage $V_{coil}$ is quickly increased from $V_1$ to $V_2$ to move the lens 12 from $x_1$ to $x_2$, then the lens 12 overshoots $x_2$, and oscillates around $x_2$ in an exponentially decaying manner for a period of time. A step response of a system where the system initially overshoots, and then oscillates about, a final steady-state value (here position $x_2$) may be called an under-damped step response. For example, as shown in FIG. 2, an embodiment of the lens 12 may initially overshoot $x_2$ by approximately 80% of the difference between $x_1$ and $x_2$, and the time required for the amplitude of this oscillation to settle to 10% of the difference between $x_1$ and $x_2$ may be approximately 150 milliseconds (ms). A similar analysis also applies of $V_1$ is greater than $V_2$ and $x_1$ is greater than $x_2$, in which case the lens 12 may undershoot its desired new focus position $x_2$.

Unfortunately, a relatively poor under-damped response such as shown in FIG. 2 may render the lens assembly 10 of FIG. 1 unsuitable for some applications. For example, an embodiment of the lens assembly 10 with the under-damped response of FIG. 2 may be unsuitable for use in a pocket-digital-camera application because the assembly takes too long to move the lens 12 between steady-state focus positions.

One technique for reducing the overshoot/undershoot and settling time of a second-order system such as the lens assembly 10 is to increase the damping level of the assembly. But increasing the damping level may increase the power required to move the lens 12 from one position to another, and this increased power may be unsuitable for some applications, such as an application where the lens assembly 10 is battery powered.

Figure 3A:
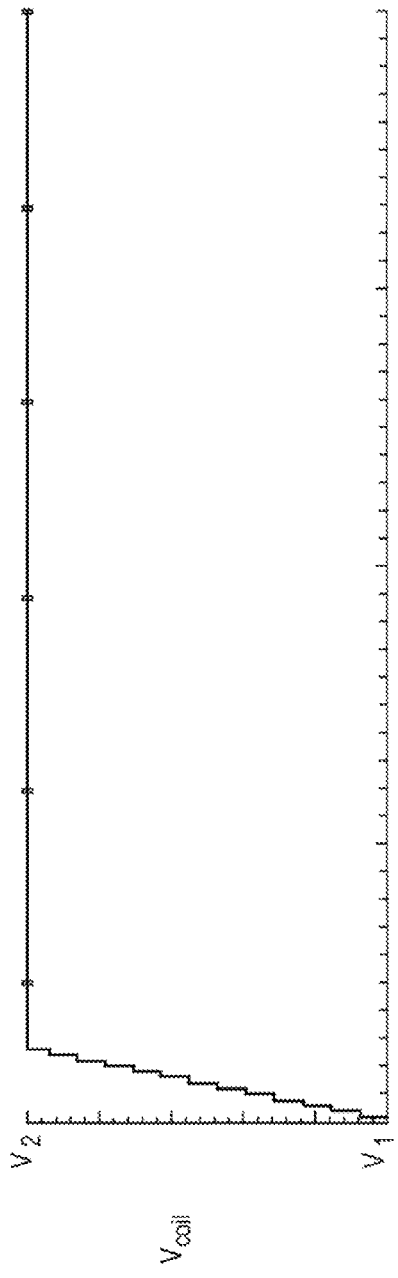
FIG. 3A is a plot of an embodiment of a drive waveform that may improve the response of an embodiment of the lens assembly of FIG. 1 by reducing the overshoot/undershoot and settling time of the assembly.
Figure 3B:
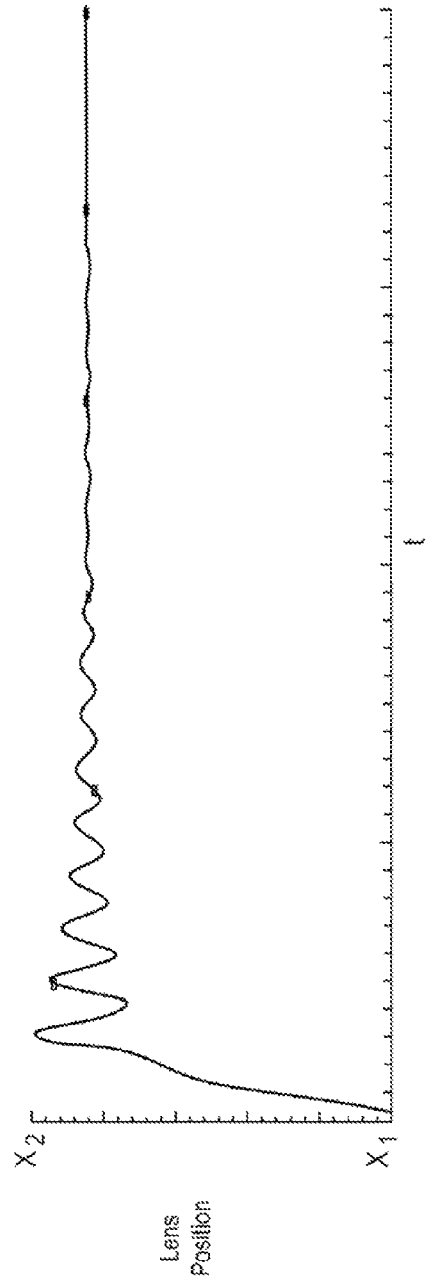
FIG. 3B is a plot of the response of an embodiment of the lens assembly of FIG. 1 when driven with the drive waveform of FIG. 3A.

Another technique for reducing the overshoot/undershoot and settling time of a second-order system such as the lens assembly 10 is described in conjunction with FIGS. 3A and 3B.

FIG. 3A is a plot of an embodiment of the coil voltage $V_{coil}$ with which a system may drive the coil 18 of FIG. 1.

FIG. 3B is a plot of the response of an embodiment of the lens assembly 10 of FIG. 1 when the coil 18 is driven with $V_{coil}$ of FIG. 3A.

Referring to FIG. 3A, instead of changing the coil 18 drive voltage $V_{coil}$ as quickly as possible, the system in which the lens assembly 10 is installed may lengthen the time over which it changes $V_{coil}$. For example, the system may increase $V_{coil}$ from $V_1$ to $V_2$ in a series of steps having substantially the same voltage magnitude and substantially the same duration.

But referring to FIG. 3B, even increasing the time over which the system changes the drive voltage $V_{coil}$ may fail to render an embodiment of the lens assembly 10 suitable for some applications. Although increasing the time over which $V_{coil}$ is changed may reduce the amplitude of the overshoot/undershoot, it may also increase the settling time to an unsuitable level. That is, increasing the time over which $V_{coil}$ is increased/decreased to achieve a suitable level of overshoot/undershoot in the lens assembly 10 may undesirably increase the settling time of the lens assembly to an unsuitable level.

Figure 4A:
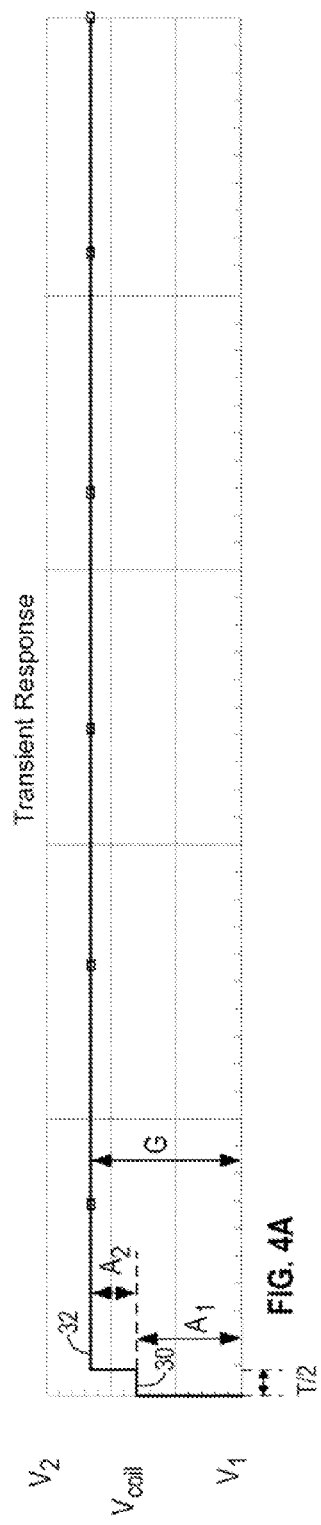
FIG. 4A is a plot of another embodiment of a drive waveform that may improve the response of an embodiment of the lens assembly of FIG. 1 by reducing the overshoot and settling time of the lens assembly.
Figure 4B:
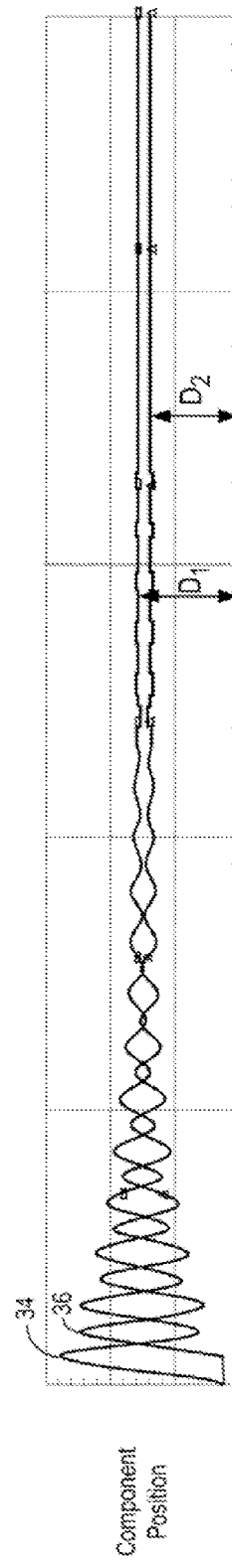
FIG. 4B is a plot of the components of the response of an embodiment of the lens assembly of FIG. 1 when driven by the drive waveform of FIG. 4A.
Figure 4C:
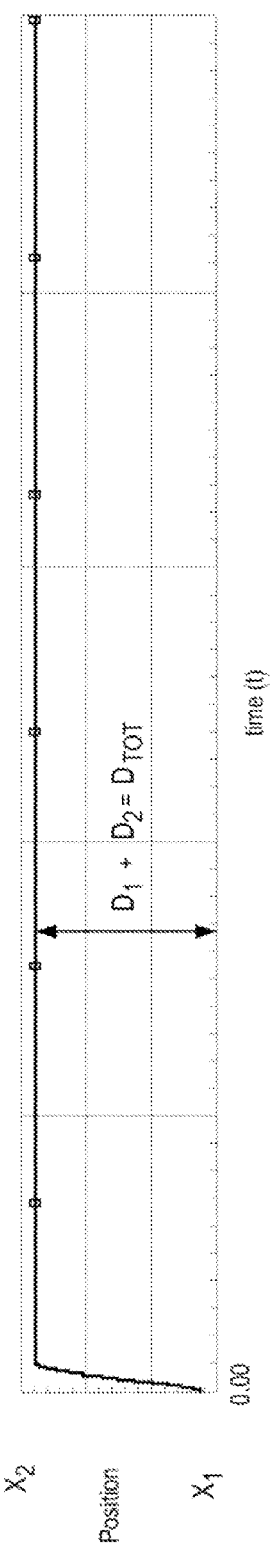
FIG. 4C is a plot of the overall response (i.e., sum of the response components) of an embodiment of the lens assembly of FIG. 1 when driven by the drive waveform of FIG. 4A.

Referring to FIGS. 4A-4C, another technique for reducing the overshoot/undershoot amplitude and the settling time of an under-damped embodiment of the lens assembly 10 (or of any other under-damped second-order system) is described.

FIG. 4A is a plot of an embodiment of a multi-component voltage $V_{coil}$ with which a system may drive the coil 18 of FIG. 1.

FIG. 4B is a plot of the respective responses of an embodiment of the lens assembly 10 of FIG. 1 to the $V_{coil}$ components of FIG. 4A.

FIG. 4C is a plot of the overall response of an embodiment of the lens assembly 10 of FIG. 1 to $V_{coil}$ of FIG. 4A.

Referring to FIGS. 4A-4C, in general, an embodiment of the technique is to drive a second-order system (e.g., the lens assembly 10 of FIG. 1) with a multi-component drive signal such that the decaying oscillations caused by each of the drive-signal components substantially cancel one another. That is, once the system reaches a desired new position, it substantially remains there. Consequently, the effective settling time is approximately equal to the time required for the system to first reach the new position. Furthermore, the system may reach the new position more quickly than if the system's physical level of damping were increased to reduce overshoot/undershoot For example, referring to FIGS. 1 and 4A, a system that incorporates the lens assembly 10 may change the drive voltage $V_{coil}$ across the coil 18 in two component steps 30 and 32 having respective amplitudes $A_1$ and $A_2$, where the second component step 32 begins approximately a time T/2 after the first component step 30, where T is the period at which each of the component steps causes the lens assembly to oscillate, and wherein $A_1+A_2=G=V_2-V_1$.

Referring to FIGS. 1 and 4A-4B, the $V_{coil}$ components 30 and 32 of FIG. 4A set up respective oscillation components 34 and 36 in the lens assembly 10, where the components 34 and 3 substantially cancel one another. The components 34 and 36 have the same oscillation frequency $f_d$, but have different respective steady-state amplitudes $D_1$ and $D_2$ such that $x_2=++D_2$. But because the $V_{coil}$ component 32 is applied to the coil 18 approximately a time T/2 (T=1/$f_d$) after the $V_{coil}$ component 30 is applied to the coil, the oscillation component 36 is shifted by approximately 180° relative to the oscillation component 34. Therefore, the oscillations (i.e., the overshoot and undershoot portions) of the component 36 substantially cancel the oscillations of the component 34 starting at approximately time T/2. For example, the peaks of the oscillating component 34 are substantially aligned with, and thus substantially cancel, the valleys of the oscillating component 36, and vice-versa.

Consequently, referring to FIG. 4C, starting at time T/2, the sum of the oscillation components 34 and 36 equals an approximately constant position $x_2=+D_1+D_2$. That is, one may effectively increase the damping level of an underdamped system without decreasing the system's response time (e.g., the time it takes for the lens 12 to travel from position x1 to position x2 in FIG. 4C) by driving the system with a waveform similar to that of FIG. 4A Referring to FIGS. 1 and 4A-4C, such a technique may reduce both the overshoot/undershoot amplitude and the settling time of the lens assembly 10. And this technique may accomplish such a reduction without modifying the physical characteristics (e.g., the damping level or damping coefficient) of the lens assembly 10. Therefore, this technique may reduce the time and cost of manufacturing a system such as a lens assembly 10, because the overshoot/undershoot amplitude, the settling time, or both the overshoot/undershoot amplitude and the settling time, of the system may be adjusted by programming/modifying the drive waveform instead of physically modifying the system.

Still referring to FIGS. 1 and 4A-4C, an embodiment for calculating the amplitudes $A_1$ and $A_2$ of the $V_{coil}$ components 30 and 32 is described.

The position x with respect to time t of a second-order system such as the lens assembly 10 may be described according to the following equation:

$$x(t) = P(1 - e^{-\zeta \omega_0 t}(A \cos \omega_d t + B \sin \omega_d t)) \quad (1)$$

where P is the step in the position x applied to the system, $\zeta$ is the damping coefficient of the system, $\omega_0$ is the natural radial frequency of the system, and $\omega_d$ is the damped natural radial frequency of the system ($\omega_d = \omega_0 \sqrt{1-\zeta^2}$) $-\omega_d$ is the actual radial frequency of the decaying oscillations of an underdamped system.

Therefore, x(t) for each of the position components 34 and 36 is given by the following equations:

$$x_{34}(t) = D_1(1 - e^{-\zeta\omega_0 t}(A\cos\omega_d t + B\sin\omega_d t)) \quad (2)$$

$$x_{36}(t) = D_2\left(1 - e^{-\zeta\omega_0\left(t-\frac{T}{2}\right)}\left(A\cos\omega_d\left(t-\frac{T}{2}\right) + B\sin\omega_d\left(t-\frac{T}{2}\right)\right)\right) \quad (3)$$

For the oscillations of the components 34 and 36 to effectively cancel such that these components sum to a substantially constant position $D_{tot}=D_1+D_2$ starting at time T/2, one may set the sum of equations (2) and (3) equal to $D_1+D_2=D_{tot}$ starting at time T/2 as follows:

$$D_1(1 - e^{-\zeta\omega_0 t}(A\cos\omega_d t + B\sin\omega_d t)) + \quad (4)$$
$$D_2\left(1 - e^{-\zeta\omega_0\left(t-\frac{T}{2}\right)}\left(A\cos\omega_d\left(t-\frac{T}{2}\right) + B\sin\omega_d\left(t-\frac{T}{2}\right)\right)\right) = D_{tot}$$

Because equation (4) holds at all values of $t \geq T/2$, one may solve for $D_1$ by setting $t=T/2$ and by setting $D_2=D_{tot}-D_1$ in equation (4). Therefore, $D_1$ and $D_2$ are given by the following equations:

$$D_1 = \frac{D_{tot}}{1 + e^{-\zeta\omega_0\frac{T}{2}}} \quad (5)$$

$$D_2 = D_{tot}\left(1 - \frac{1}{1 + e^{-\zeta\omega_0\frac{T}{2}}}\right) \quad (6)$$

And in an embodiment where $G=V_2-V_1$ (FIG. 4A) is a constant multiple of $D_{tot}$—one may determine the relationship between G and $D_{tot}$ by testing the lens assembly 10 to develop a general relationship between the position x of the lens 12 and the coil voltage $V_{coil}$—then $A_1$ and $A_2$ are given by the following equations:

$$A_1 = \frac{G}{1 + e^{-\zeta\omega_0\frac{T}{2}}} \quad (7)$$

$$A_2 = G\left(1 - \frac{1}{1 + e^{-\zeta\omega_0\frac{T}{2}}}\right) \quad (8)$$

Furthermore, for $\zeta \ll 1$ (e.g., $\zeta=0.05$), one may approximate $A_1$ and $A_2$ from equations (7) and (8) as:

$$A_1 = G(0.5+\zeta) \quad (9)$$

$$A_2 = G(0.5-\zeta) \quad (10)$$

The values of $A_1$ and $A_2$ for an expected range of G may be stored in a look-up table (omitted from FIG. 1) of the system that incorporates the lens assembly 10.

Still referring to FIGS. 4A-4C, other embodiments of this technique are contemplated. For example, Vcoil may have more than two components that set up more than two position components in the lens assembly 10 such that the position components sum to substantially a constant value after a particular time period has elapsed.

Figure 5:
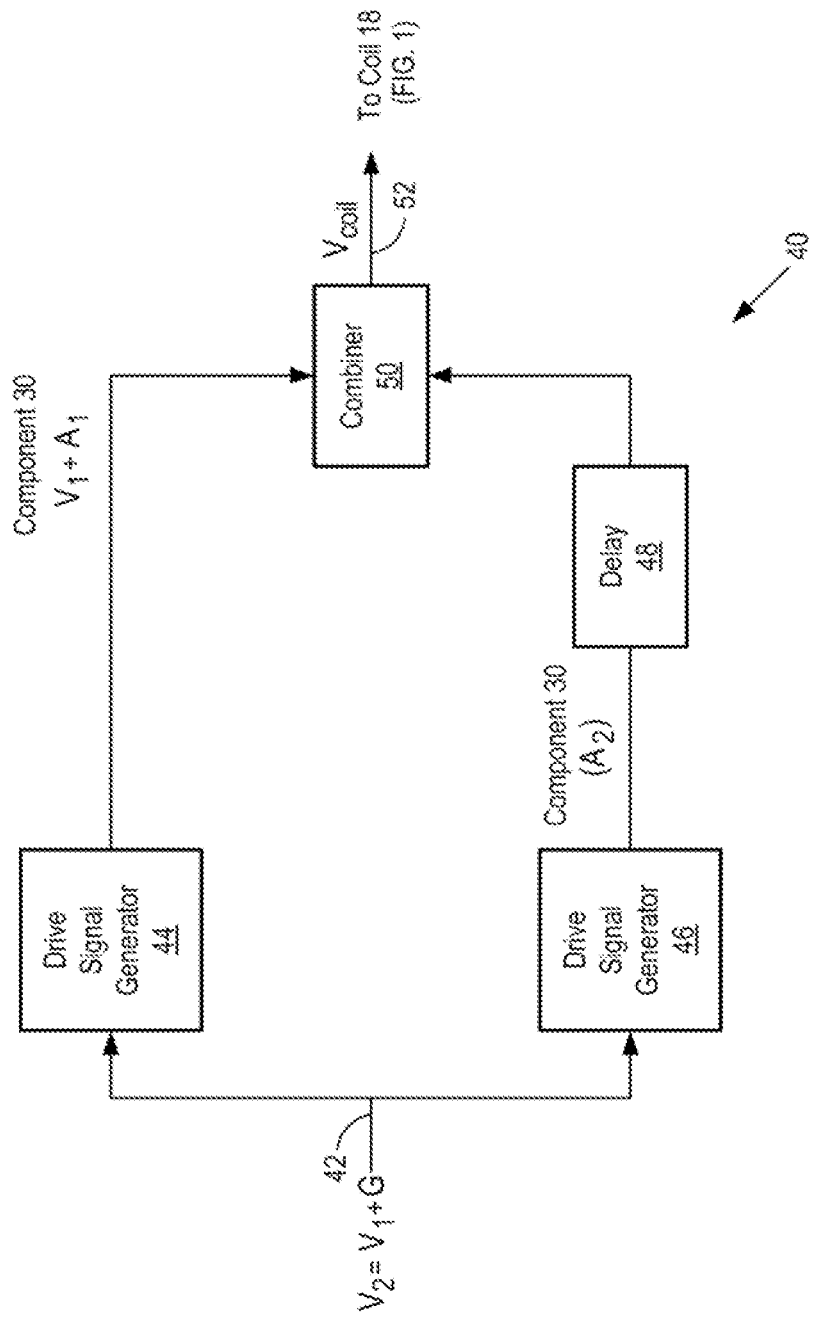
FIG. 5 is a diagram of an embodiment of a drive circuit for driving an embodiment of the lens assembly of FIG. 1 with an embodiment of the waveform of FIG. 4A.

FIG. 5 is a diagram of an embodiment of a drive circuit 40 for generating the coil drive voltage $V_{coil}$ according to an embodiment of the plot of FIG. 4A.

The drive circuit 40 includes an input node 42, first and second programmable drive-signal generators 44 and 46 for respectively generating the components 30 and 32 of $V_{coil}$, a programmable delay 48 for delaying the component 32, a combiner 50 for generating $V_{coil}$ from the component 30 and the delayed component 32, and an output node 52 coupled to the coil 18 of the lens assembly 10 of FIG. 1.

In operation, the system in which the lens assembly 10 is installed generates at the input node 42 an input signal representing or having the amplitude of the voltage $V_2$ needed to move the lens 12 from a position $x_1$ to a position $x_2$, where the difference $V_2-V_1$ (the current drive voltage)=G.

The signal generator 44 generates a signal representing or having the amplitude $V_1+A_1$ ($A_1$ is the amplitude of the component 30), and the signal generator 46 generates a signal representing or having the amplitude $A_2$ of the component 32. For example, the signal generators 44 and 46 may obtain the amplitudes $A_1$ and $A_2$ from one or more look-up tables (not shown in FIG. 5) in response to the value G. The system which incorporates the lens assembly 10 may provide the value G to the generators 44 and 46 (or to associated look-up tables), or the generators may calculate G from $V_1$ and $V_2$. Furthermore, the generator 44 may generate the component 30 by subtracting approximately $A_2$ from the input signal on the node 42.

The delay 48 generates a signal representing or having zero amplitude for a programmed delay time, such as T/2, and thereafter generates a signal representing or having the amplitude $A_2$ of the component 32. For example, where the desired programmed delay time is T/2, then one may program the delay 48 to have a duration that approximates T/2 and that is given by the following equation:

$$\Delta t = \frac{T}{2} = \frac{\pi}{\omega_0 \sqrt{1-\varsigma^2}} \approx \frac{\pi}{\omega_0} \quad (11)$$

The delay 48 may obtain the value of Δt from a look-up table (omitted from FIG. 5) in response to the value of T, where the look-up table stores values of Δt for an anticipated range of T. And Δt may have a resolution suitable for the application for which the drive circuit 40 is being used.

The combiner generates on the output node 52 the coil drive signal $V_{coil}$ having an amplitude equal to approximately $V_1+A_1$ from time t=0 to time t~T/2, and equal to approximately $V_1+A_1+A_2=V_2$ thereafter. For example, the combiner may be an adder.

Still referring to FIG. 5, alternate embodiments of the circuit 40 are contemplated. For example, instead of generating the coil drive voltage $V_{coil}$, the circuit 40 may generate the coil drive current $I_{coil}$. Furthermore, the circuit 40 may be modified to drive second-order systems other than a lens assembly. Moreover, if $V_{coil}$ on the output node 52 is in digital form, then the circuit 40 may include a digital-to-analog converter (DAC) to generate $V_{coil}$ in analog form. In addition, the signal generated by the combiner 50 may represent $V_{coil}$, and one or more other circuits may generate $V_{coil}$ and apply $V_{coil}$ to the coil 18. Furthermore, any signal referred to as a voltage may be a current.

Figure 5A:
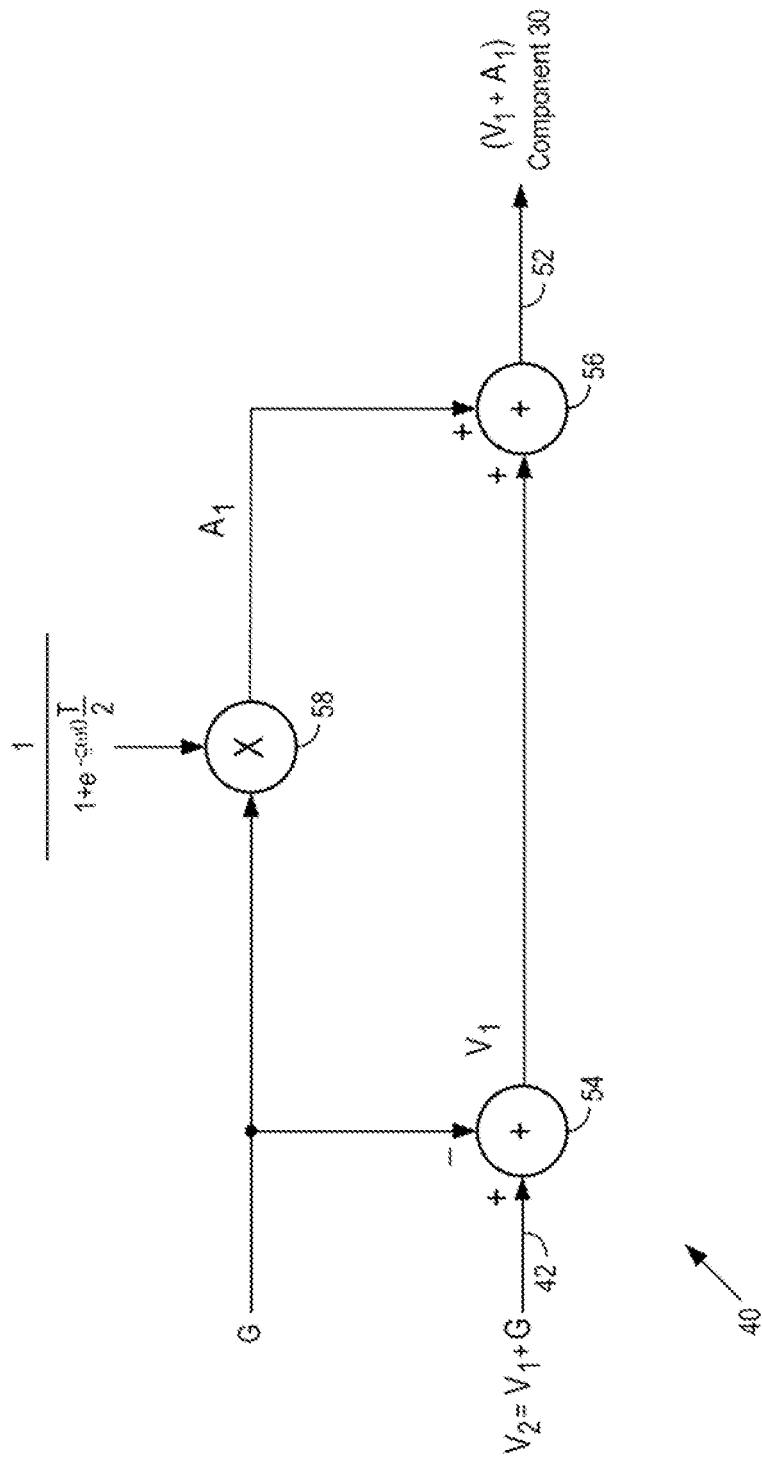
FIG. 5A is a diagram of an embodiment of a programmable signal generator of FIG. 5.

FIG. 5A is a diagram of an embodiment of the programmable signal generator 44 of FIG. 5. Because the signal generator 44 is programmable, it may be used with a wide variety of lens assemblies or other second-order systems having a wide range of response characteristics.

The signal generator 44 includes adders 54 and 56 and a multiplier 58.

In operation, the adder 54 subtracts G from $V_2=V_1=G$ to generate a signal representing or having the amplitude $V_1$. The adder 54 may receive G from the controller (omitted from FIG. 5A) for the system in which the signal generator 44 is installed, or from another suitable source.

The multiplier 58 multiplies G by $$\frac{1}{1+e^{-\varsigma\omega_0\frac{T}{2}}}$$

to generate a signal representing or having the amplitude $A_1$ per equation (7). The multiplier 58 may be programmed with the value $$\frac{1}{1+e^{-\varsigma\omega_0\frac{T}{2}}},$$

or may receive this value from the system controller (omitted from FIG. 5A) or from a look-up table (omitted from FIG. 5A). Or, the multiplier 58 may receive only the value of T or T/2 from the controller or a look-up table, and derive the multiplier $$\frac{1}{1+e^{-\varsigma\omega_0\frac{T}{2}}}$$

from this value. Alternatively, the multiplier 58 may multiply G by (0.5+ζ) per equation (9), and may be programmed with the value ζ, or may receive this value from the system controller or a look-up table.

The adder 56 sums the signals from the adder 54 and the multiplier 58 to generate on the output node 52 the drive-signal component 30, which represents or has the amplitude $V_1+A_1$.

Still referring to FIG. 5A, alternate embodiments of the signal generator 44 are contemplated. For example, $V_1$ may be zero. Furthermore, the signal generator 46 of FIG. 5 may include only a multiplier that generates $A_2$ from G according to equation (8) or equation (10).

Figure 6:
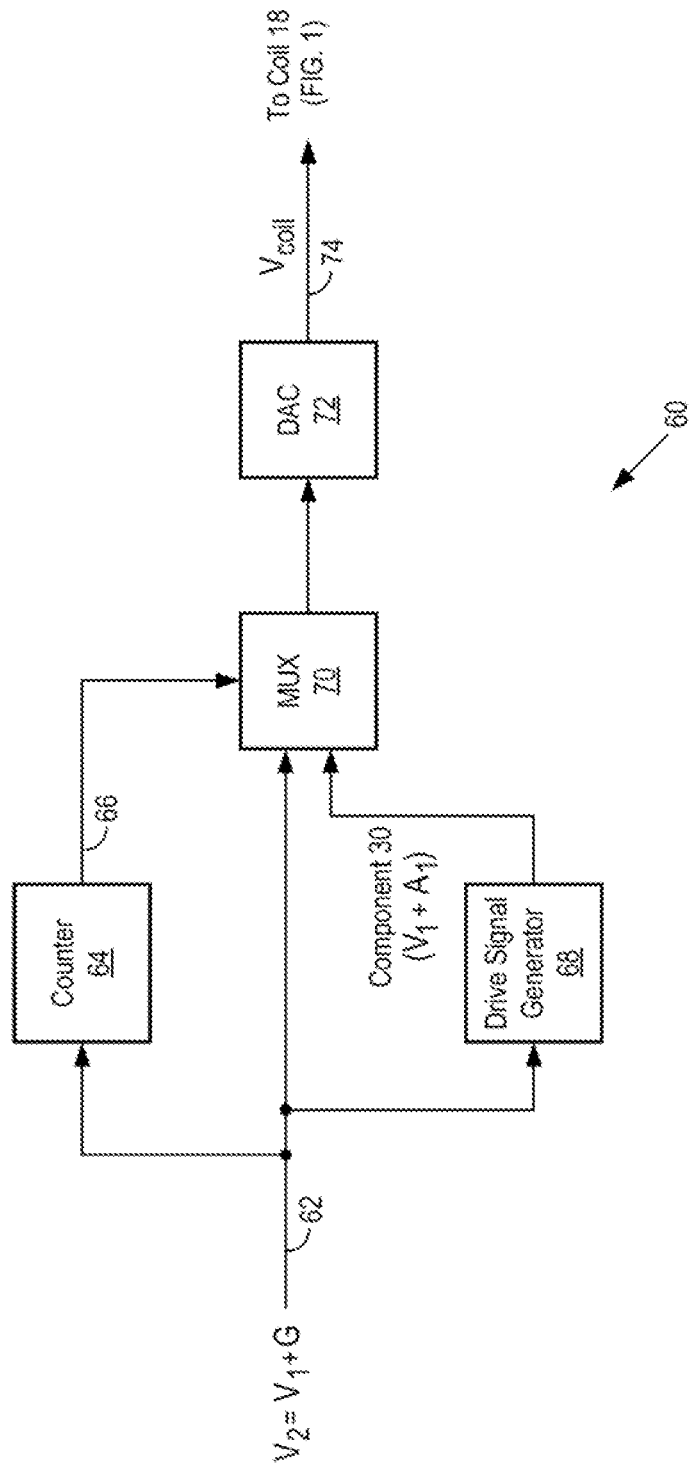
FIG. 6 is a diagram of another embodiment of a drive circuit for driving an embodiment of the assembly of FIG. 1 with an embodiment of the waveform of FIG. 4A.

FIG. 6 is a diagram of an embodiment of a drive circuit 60 for generating the coil drive voltage $V_{coil}$ according to an embodiment of the plot of FIG. 4A.

The drive circuit 60 includes an input node 62, a counter 64 having an output node 66, a programmable drive-signal generator 68 for generating the component 30 (FIG. 4A) of $V_{coil}$, a multiplexer 70, an optional DAC 72, and an output node 74 coupled to the coil 18 of the lens assembly 10 of FIG. 1.

In operation, the system in which the lens assembly 10 is installed generates at the input node 42 an input signal representing or having an amplitude equal to the voltage $V_2$ needed to move the lens 12 from a position $x_1$ to a position $x_2$.

In response to the input signal, the counter 64 begins counting. The counter 64 is programmed to output on the node 66 a selection signal having a first value starting from the counter's reception of the input signal until a duration approximately equal to T/2 has elapsed, and having a second value thereafter. Count values Δt (approximately equal to T/2) for the counter 64 may be calculated according to equation (11) and stored in a look-up table (omitted from FIG. 6) for an expected range of T.

The signal generator 68 generates from the input signal a component drive signal representing or having the amplitude $V_1+A_1$ of the component 30 of FIG. 4A. For example, the generator 68 may subtract from the input signal a programmed value approximately equal to $A_2$. This value may be calculated from G and equation (8) or (10), or obtained from a look-up table (omitted from FIG. 6). An embodiment of the signal generator 68 may be similar to the signal generator 44 of FIGS. 5 and 5A.

The multiplexer 70 outputs the component 30 from the generator 68 in response to the counter output signal having the first value (i.e., before the counter value reaches approximately T/2), and then outputs the input signal in response to the counter output signal having the second value (i.e., after the counter value reaches approximately T/2).

The DAC 72 converts the multiplexer output into the analog version of the drive voltage $V_{coil}$ on the output node 74.

Still referring to FIG. 6, alternate embodiments of the circuit 60 are contemplated. For example, one or more of the alternate embodiments described above in conjunction with the circuit 40 of FIG. 5 may be applied to the circuit 60.

FIG. 7 is a diagram of an embodiment of a system, such as a camera system 80, that may incorporate the lens assembly 10 of FIG. 1 and an embodiment of the lens drive circuit 40 of FIG. 5 or of the lens drive circuit 60 of FIG. 6. But for example purposes, the system 80 is described as including an embodiment of the lens drive circuit 60 of FIG. 6.

In addition to the lens assembly 10 and the lens drive circuit 60, the camera system 80 includes a controller 82 for generating the drive voltage (e.g., $V_2$) on the drive-circuit input node 62 (FIG. 6) and a signal representing the change G in the drive voltage, and for otherwise controlling the operation of the camera system. The controller 82 may generate the drive voltage and the signal representing G in response to one or more circuits, such as an auto- or manual-focus circuit (omitted from FIG. 7), or in response to an operator input (e.g., pressing a focus button).

The camera system 80 may also include a pixel array 84 for capturing an image, where the lens assembly 10 causes the lens 12 to focus the image onto the pixel array.

The circuit 60, controller 82, and pixel array 84, as well as any other circuits of the camera 80, may be disposed on a same or on different integrated circuits (ICs) and on a same or on different IC dies.

Although described as a camera system including a lens assembly, the system 80 may be any other type of system that incorporates a second-order subsystem other than a lens assembly, and the drive circuit 60 may be modified to drive such another second order subsystem.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A circuit, comprising:
   a first generator operable to generate a first drive signal; and
   a second signal generator operable to receive the first drive signal and a second drive signal, and to generate from the first and second drive signals a system drive signal having a first amplitude for a first duration and having a second amplitude after the first duration, the system drive signal operable to cause an under-damped system to operate in a substantially damped manner.

2. The circuit of claim 1, further comprising a third signal generator operable to generate the second drive signal.

3. The circuit of claim 1 wherein:
   the first generator is operable to generate the first drive signal having approximately the first amplitude; and
   the second generator is operable to receive the second drive signal having approximately the second amplitude.

4. The circuit of claim 1, further comprising:
   wherein the first generator is operable to generate the first drive signal having approximately the first amplitude; and
   a third generator operable to generate the second drive signal having approximately a third amplitude that is approximately equal to a difference between the first and second amplitudes.

5. The circuit of claim 1, further comprising:
   wherein the first generator is operable to generate the first drive signal having approximately the first amplitude; and
   a third generator operable to receive a third drive signal and to generate from the third drive signal the second drive signal having approximately a third amplitude that is approximately equal to a difference between the first and second amplitudes.

6. The circuit of claim 1, further comprising:
   wherein the first generator is operable to generate the first drive signal having approximately the first amplitude;
   a third generator operable to generate the second drive signal having approximately a third amplitude that is approximately equal to a difference between the first and second amplitudes; and
   wherein the second generator is operable to combine the first and second drive signals after the first duration.

7. The circuit of claim 1 wherein the second signal generator is operable to generate the system drive signal by delaying the second drive signal relative to the first drive signal.

8. The circuit of claim 1 wherein the second signal generator is operable to generate the system drive signal by delaying the second drive signal relative to the first drive signal by approximately half of a period of a response frequency of the system.

9. The circuit of claim 1, further comprising a third generator operable to generate the second drive signal delayed relative to the first drive signal.

10. The circuit of claim 1, further comprising a third generator operable to generate the second drive signal delayed relative to the first drive signal by approximately half of a period of a response frequency of the system.

11. The circuit of claim 1 wherein the first generator is operable to receive the second drive signal and to generate the first drive signal from the second drive signal.

12. A system, comprising:
    an under-damped subsystem; and
    a circuit operable to drive the subsystem, the circuit including:
       a first generator operable to generate a first drive signal; and
       a second signal generator operable to receive the first drive signal and a second drive signal, and to generate from the first and second drive signals a system drive signal having a first amplitude for a first duration and having a second amplitude after the first duration, the system drive signal operable to cause the under-damped subsystem to operate in a substantially damped manner.

13. The system of claim 12 wherein the under-damped subsystem comprises an under-damped second-order subsystem.

14. The system of claim 12 wherein the under-damped subsystem comprises an electric motor.

15. The system of claim 12 wherein the under-damped subsystem comprises a spring-loaded voice-coil motor.

16. The system of claim 12 wherein the under-damped subsystem comprises a lens assembly.

17. The system of claim 12, further comprising a controller operable to generate the second drive signal.

18. The system of claim 12, further comprising:
    a controller operable to generate the second drive signal; and
    wherein the first signal generator is operable to generate the first drive signal from the second drive signal.

19. The system of claim 12, further comprising:
    a controller operable to generate a third drive signal;
    a third signal generator operable to generate the second drive signal from the third drive signal; and
    wherein the first signal generator is operable to generate the first drive signal from the third drive signal.

20. A method, comprising:
    driving an under-damped system with a drive signal having a first magnitude for a first period; and
    changing the first magnitude of the drive signal to a second magnitude in response to an end of the first period, the under-damped system effectively operating as a damped-system responsive to the drive signal having the first and second magnitudes.

21. A method, comprising:
    driving an under-damped system with a drive signal having a first magnitude for a first period;
    changing the first magnitude of the drive signal to a second magnitude in response to an end of the first period; and wherein the second magnitude is greater than the first magnitude.

22. The method of claim 21 wherein the first period is approximately equal to half a period of a damped resonant frequency of the system.

23. The method of claim 21, further comprising:
generating the drive signal from a first signal having the first magnitude during the first period; and
generating the drive signal from a second signal having the second magnitude in response to the end of the first period.

24. The method of claim 21, further comprising:
generating the drive signal from a first signal having the first magnitude during the first period;
generating a second signal having a magnitude approximately equal to a difference between the first and second magnitudes; and
generating the drive signal from a combination of the first and second signals in response to the end of the first period.

25. The method of claim 21, further comprising:
generating the drive signal from a first signal having the first magnitude during the first period;
generating a second signal having a magnitude approximately equal to a difference between the first and second magnitudes;
delaying the second signal by approximately the first period; and
generating the drive signal from a combination of the first signal and the delayed second signal.

26. A method, comprising:
causing an under-damped system to oscillate at a damped frequency having a first phase; and
causing the system to oscillate at substantially the damped frequency having a second phase such that the oscillation at the first phase substantially cancels the oscillation at the second phase.

27. The method of claim 26, further comprising causing the system to oscillate at the second phase a time after causing the system to oscillate at the first phase.

28. The method of claim 26, further comprising causing the system to oscillate at the second phase approximately one half of the oscillation period after causing the system to oscillate at the first phase.

29. The method of claim 26 wherein the difference between the first and second phases is approximately 180 degrees.

30. The method of claim 26 wherein the oscillations at the first and second phases comprise respective decaying oscillations.

31. The method of claim 26 wherein the oscillations at the first and second phases comprise respective exponentially decaying oscillations.

32. The method of claim 26, further comprising:
scaling the oscillations at the first phase by a first factor;
scaling the oscillations at the second phase by a second factor; and
wherein a position of the system approaches a sum of the first and second factors over time.

33. The method of claim 26, further comprising:
causing the oscillations at the first phase by applying an approximately step input of a first amplitude to the system at a first time; and
causing the oscillations at the second phase by applying an approximately step input of a second amplitude to the system at a second time.

34. The method of claim 26 wherein:
the second time is subsequent to the first time; and
the first amplitude is greater than the second amplitude.

* * * * *